United States Patent
Lamparter et al.

[15] 3,686,460
[45] Aug. 22, 1972

[54] APPARATUS FOR CONTROLLING THE TEMPERATURE OF AN INDUCTIVELY HEATED DRAW ROLL

[72] Inventors: Hansruedi Lamparter; Gelli Anton Spescha, both of Winterthur, Switzerland

[73] Assignee: Rieter Machine Works, Ltd., Winterthur, Switzerland

[22] Filed: July 21, 1971

[21] Appl. No.: 164,577

[30] Foreign Application Priority Data

July 23, 1970 Switzerland............11160/70

[52] U.S. Cl. ............219/10.77, 219/471, 219/10.61
[51] Int. Cl. .......B21b 27/06, H05b 3/02, H05b 9/06
[58] Field of Search........219/10.77, 10.61, 469, 470, 219/471, 10.75, 497; 13/26

[56] References Cited

UNITED STATES PATENTS 3,242,302   3/1966   Williams...................219/497
3,441,702   4/1969   De La Bretoniere......219/471

*Primary Examiner*—J. V. Truhe
*Assistant Examiner*—Hugh D. Jaeger
*Attorney*—Kenyon & Kenyon Reilly Carr & Chapin

[57] ABSTRACT

The signal processing device for controlling the supply of heat energy to the heating coil utilizes a circuit in which a signal is produced in proportion to the resistance of the roll. The signal is obtained from signals proportional to the voltage measured in the coil and the current in the coil. The proportional signal is then used to shut off or open the supply of heat energy to the coil if the signal exceeds or falls below a pre-set signal corresponding to the desired roll temperature.

11 Claims, 7 Drawing Figures

APPARATUS FOR CONTROLLING THE TEMPERATURE OF AN INDUCTIVELY HEATED DRAW ROLL

This invention relates to an apparatus for controlling the temperature of an inductively heated thread transporting roll, particularly, in a machine for processing endless synthetic threads.

Heretofore, it has been known to heat endless synthetic threads to a desired temperature by means of inductively heated draw rolls and to control the temperature of the cylindrical draw roll wall supporting the thread. For example, it has been known to control the temperature by mounting a temperature gauge on a stationary part of the draw roll apparatus and generating a measured value signal corresponding to the effective temperature measured by the gauge for transmission to a control device. This, however, has a number of considerable disadvantages. First, in order to transmit a measured value signal from each gauge of a number of such gauges to a control device provided at a center location, a double lead which in many cases has been relatively long, must be installed. This arrangement is very expensive due to the large number of rolls and measuring points provided on a machine for processing endless threads. Furthermore, sources of errors are created due to the multitude of connections of these leads. Also, the contacts of the leads can be faulty and this can cause biased measured values.

A further disadvantage is that the temperature gauge cannot be placed at the very location at which the temperature is to be measured, i.e. not at the roll wall surface contacting the thread. Instead, the gauge can only be placed either at the inside surface of the cylindrical roll wall or at a face wall of the roll. The transmission of the temperature, thus, must be effected over a distance, however, short, via the air present in the gap.

It has also been known to have the temperature gauge rotate with the roll. In these cases, the temperature gauge has been provided with an oscillator which transforms the measured value into a frequency. However, in this arrangement, the supply of energy to the oscillator presents difficulties. Furthermore, the applicability of these rotating elements is limited as to the ranges of rotational speeds and of the ambient temperatures. Also, separation of the measuring signals emitted proves difficult if the heated rolls are located in close vicinity of each other as, e.g. in the drawing arrangements for drawing endless filaments.

Another type of contact-free measuring signal transmission has been known which relies on a rotating Wien bridge. In this case, the constant elements of the Wien bridge have been cast into a disc of synthetic material and the disc has been mounted on the draw roll. The temperature sensitive resistors, that are part of the bridge, are located in the draw roll wall. In addition, transmission coils have been provided in the disc of synthetic material and have been arranged on its circumference. In order to transmit the measuring signal, two transmitter heads partly surrounding the rim of the disc have been needed along with a shielded double lead from each head to the centrally located registering or control device. However, in addition to this complicated cable arrangement, considerable operational deficiencies have been noted, as the heads can be damaged or torn off in case of yarn path disturbances, particularly in case of lap formation. Also, for operational purposes the discs of synthetic material have been found to be disadvantageous, as either the discs or the heads must be taken off before the draw roll can be exchanged. A further operational disadvantage of the Wien bridge resides in that the signal transmitter head can be located in the neutral zone between two transmission coils in case the drawroll is at a standstill. As a result, the signal transmission is interrupted. The draw roll temperature signal, thus, no longer is transmitted and no longer is controlled. This disadvantage can be avoided if two discs with one transmitter head each are provided. This arrangement, however, again is more complicated and expensive.

A further contact-free measuring signal transmission is known in which a measuring gauge mounted in the cylindrical draw roll wall, i.e. a gauge rotating with the draw roll, has been coupled like a transformer to a signal transformer circuit. The output of this has been a voltage proportional to the temperature measured which has been transmitted to a measuring instrument for direct display or transmitted to a control device as effective value. The control device, via thyristors, has influenced the heating energy in order to maintain a constant temperature in the cylindrical wall of the drawroll. This method is disadvantageous, as, in addition to a transmission of heating energy, a separate inductive measuring signal transmitter for the signal generated by the temperature gauge as well as expensive signal transmission cables with their disadvantages mentioned above are needed. Also, the necessity of installing this additional inductive transmitter requires very precise installation tolerances. Still further, the draw roll can be taken off by trained qualified specialists only, as the connection between the transmitter and the gauge in the draw roll must be interrupted. A further disadvantage is the danger of contamination of the signal transmitter, particularly if the air contains dust, so that the signal transmitters need periodic cleaning. A still further considerable disadvantage of this measuring method resides in the fact that, due to the signal level transmitted, short cable lengths only to the signal processing device can be used. As a result, a large number of such devices must be arranged along the machine and cannot be arranged in a control cabinet.

Accordingly, it is an object of the present invention to eliminate the disadvantages mentioned above and to maintain the temperature of the cylindrical roll wall within the smallest range of deviations tolerable.

It is another object of the invention to obtain the closest possible coincidence of the location of the temperature measurement and of the location of heat generation and transfer.

It is another object of the invention to obtain optimum dynamic control characteristics.

It is another object of the invention to provide a simplified construction of the roll and of the measuring signal transmission for an inductively heated draw roll assembly.

It is another object of the invention to provide a robust system which is not easily affected by disturbances, which is not subject to wear, and which is independent of the rotational speed and of the sense of rotation of a draw roll.

It is another object of the invention to provide a draw roll which is independent of ambient atmospheric conditions and does not present more difficulties in mounting and taking off than a plain roll without a rotating temperature gauge.

It is another object of the invention to exclude detrimental influences on the measuring signal transmission caused by high working temperatures.

It is another object of the invention to centrally adjust a pre-set value for a large number of control systems simply and precisely.

Briefly, the invention provides a control device for the temperature of an inductively heated thread transporting roll for endless filaments having a stationary iron core arranged coaxially with the axis of rotation within the cylindrical roll wall and an induction coil surrounding the core which is fed by a source of alternating current for generating an alternating magnetic flux in the rotating cylindrical roll wall supporting the thread. In addition, the control device is provided with a signal processing device for influencing a valve for controlling the heating energy to be supplied to the induction coil. This processing device is provided with a connection for a signal proportional to the voltage applied to the coil and with a connection for a signal proportional to the current in the coil as well as with means for transforming these signals into a signal proportional to the resistance of the roll. The processing device transmits this latter signal to a control device for activating the valve.

In one embodiment, the means for forming the signal proportional to the resistance of the roll forms a quotient of the signal proportional to the voltage applied to the coil and the signal proportional to the current in the coil. In another embodiment, the means forms a difference of the signal proportional to the voltage applied to the coil and the signal proportional to the current in the coil.

In still another embodiment, the means for forming the signal proportional to the resistance of the roll can be a bridge circuit. The signal can be generated during the heating period with the network frequency or with a voltage, the frequency of which differs from the network frequency. Also, the signals can be generated between two heating periods by means of a measuring voltage of any desired frequency. In order to influence the valve and the heating energy, an impulse ratio control system or an amplitude control system can also be provided.

These and other objects and advantages of the invention will become more apparent from the following detailed description and appended claims taken in conjunction with the accompanying drawings in which:

FIG. 1 illustrates a cross-sectional view of a heated roll according to the invention;

FIG. 2 schematically illustrates a circuit diagram of the principle of the control system according to the invention;

FIG. 3 illustrates an equivalent circuit diagram for an inductively heated roll according to the invention;

FIG. 4 schematically illustrates a circuit diagram of an arrangement with a division of the tap voltages according to the invention;

Figure 1:
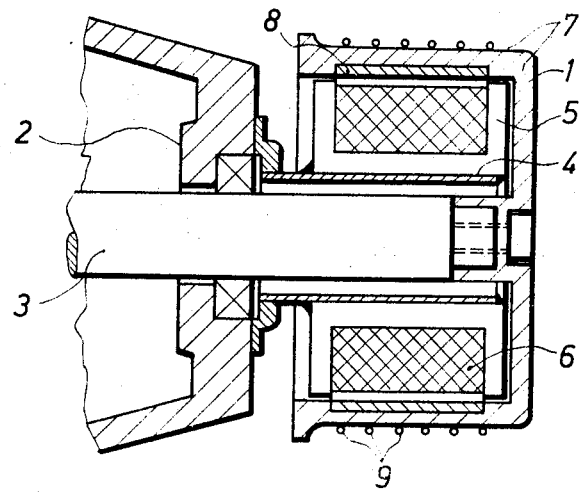

Referring to FIG. 1, a thread transporting roll 1 mounted on a shaft 3 rotatably supported in a housing 2 surrounds a coaxially arranged tube 4 rigidly secured to the housing 2. The tube 4 supports a core 5 made of iron, sheet metal elements radially lined up together or of cast iron, in which core 5 an induction coil 6 is arranged for generating a magnetic flux which originates from the core 5 and closes via the cylindrical roll wall 7. The cylindrical roll wall 7 is also provided with a ring 8 made from an electrically highly conductive material such as copper, brass or aluminum. The magnetic force lines generated by the coil 6, acting as a primary winding, generate an electrical current in the cylindrical roll wall 7 including the ring 8, acting as a secondary winding. This induced current heats up the cylindrical roll wall in order to maintain a desired temperature T of the roll wall 7 which, in turn, heats the endless filaments or threads 9 placed thereon.

In order to heat the synthetic endless filaments under conditions as constant as possible, the pre-set temperature T must be maintained; the smallest possible deviations only being tolerable. The corresponding control system thus needs a measured value of the effective temperature as precise as possible. This value is measured and processed using the electrical arrangement described in more detail in the following and illustrated by the schematic diagrams shown in FIGS. 2 and 3.

Figure 2:
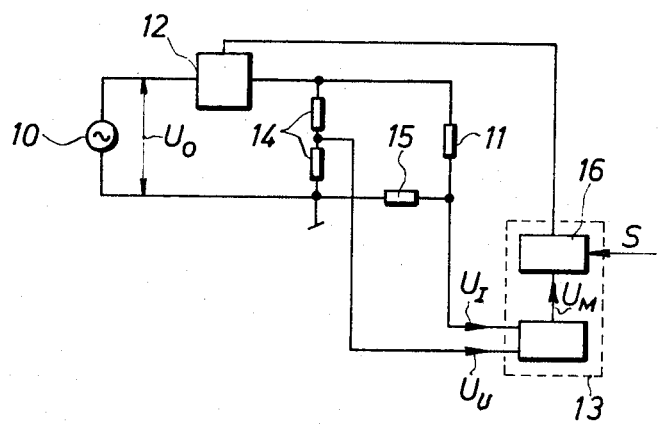
Figure 3:
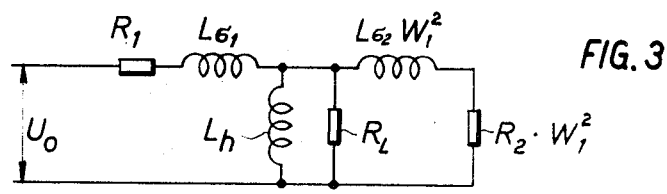

Referring to FIG. 2, a source 10 of alternating voltage supplies heating energy to an impedance 11 composed of the inductivities and of the Ohmic resistance of the roll according to the equivalent circuit diagram shown in FIG. 3. In this diagram, $R_1$ is Ohmic resistance of the induction coil 6 forming the primary winding of the transformer formed by the roll; $\epsilon_1$ denotes the primary leakage inductance; $L_h$ the main inductance; $R_L$ the equivalent Ohmic resistance for the losses of the main inductance; $L\epsilon_2$ the secondary leakage inductance; $R_2$ the Ohmic resistance of the heating ring 8 and of the portion of the cylindrical roll wall 7 influenced by the magnetic flux; and $W_1 / W_2$ the transformation ratio corresponding to the quotient of the numbers $W_1$ of the primary windings and $W_2$ of the secondary windings. The cylindrical roll wall 7 as a secondary coil forms one winding only. In this case, the number $W_2$ is 1 and, thus, $W_1 / W_2$ equals $W_1$.

The heating energy is supplied to the impedance 11 via a valve 12 which is connected with a signal processing device 13 to which a pre-set value S corresponding to the desired roll wall temperature, i.e. the pre-set temperature T is fed. In addition, as effective value, the signals $U_I$ and $U_U$ representing the effective temperature are fed in the processing device 13. These signals $U_I$, $U_U$ are obtained by taking off a voltage $U_U$ proportional to the heating voltage at a voltage divider 14 and a voltage $U_I$ proportional to the current in the coil at a shunt 15. The shunt 15 may be replaced by equivalent means, e.g. by a current transformer. These voltage take-off points are connected with the signal processing device 13 in which the two voltages are transformed into a measuring voltage signal $U_M$ which is proportional to the sum of the resistance according to the equivalent circuit diagram shown in FIG. 3. This measuring signal $U_M$ is processed further in a control device 16, which can be considered as a part of the signal processing device 13, together with a centrally adjustable prest value S.

The circuit arrangement functions as follows: If the temperature of the cylindrical roll wall 7 increases, the impedance 11 increases accordingly. As the roll wall 7 is made from steel and the ring 8 from an electrically highly conductive material, the resistances of these materials depend on their temperature. Thus, the voltages $U_U$ and/or $U_I$ change so that the measuring value $U_M$ of the effective temperature changes by a certain amount in one direction. This, in turn, causes the control device to influence the valve 12 in the sense of a reduction of the heating energy supplied to the impedance 11, i.e. to the roll. If the temperature decreases, the control process functions in the inverse sense.

The advantages achieved using this control system are:

a. The elements used for transmitting the heating energy, i.e. the primary and secondary winding of the roll are also used for transmitting the measured signal.

b. The use of the cylindrical roll wall including the heating ring as a resistance temperature gauge, i.e. the use of the temperature-dependency of the Ohmic resistance of the cylindrical roll wall itself for measuring its temperature.

c. The locations of energy supply and of the temperature measurement, i.e. the cylindrical roll wall, are not merely located in close vicinity but are absolutely identical. This ensures optimum control characteristics; the static as well as the dynamic deviations being minimal.

d. Robust roll construction combined with utmost simplicity and, thus, an inexpensive arrangement.

e. Good long term stability of the temperature measurement.

f. Very simple electrical installation as only the energy supply wires needed in any event need be connected to the roll.

Referring to FIG. 3, the resistance $R_1$ of the primary winding which is arranged in series with the resistance $R_2$ of the secondary winding, also changes with a change of its temperature so that the system according to the ratio of $R_1$ and $W_1^2 \times R_2$ measures a mixed temperature value between the temperatures of the windings of the coil 6 and of the cylindrical roll wall 7. Due to this, while the roll 1 is heated up from a cold state, an excessive roll wall temperature is initially prevented. deviation disappears, however, as the temperature of the winding nears the roll temperature, the influence of the value $W_1^2 \times R_2$ being considerably more important than the comparatively small value of the resistance $R_1$. In draw rolls of the usual type, the value $W_1^2 \times R$ is about 90 percent of the total impedance 11.

Figure 4:
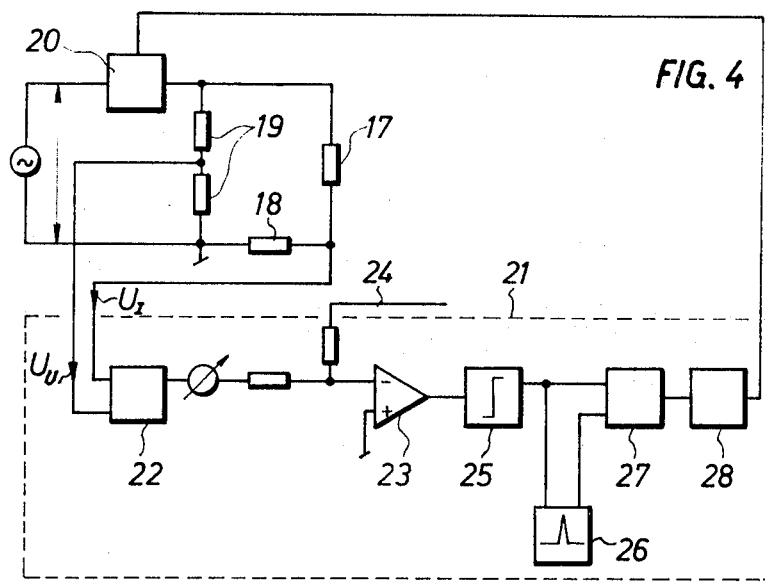
Figure 5:
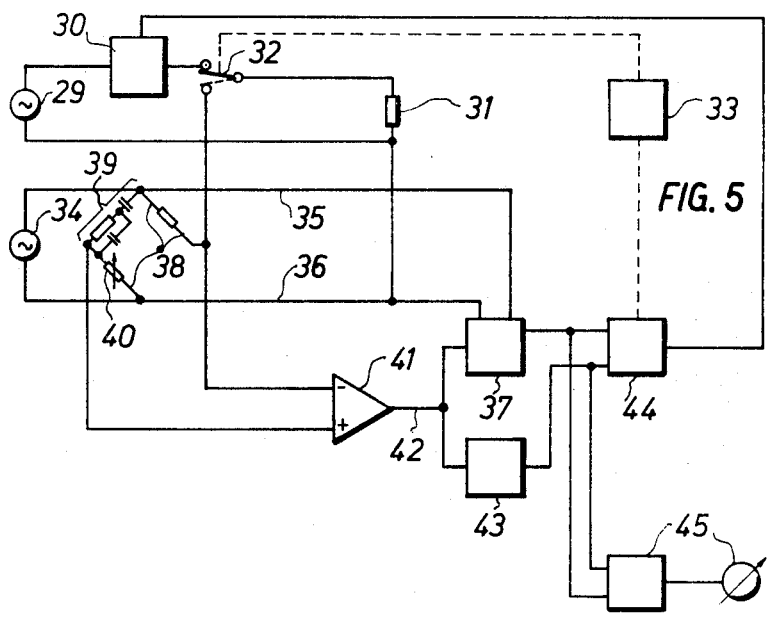
FIG. 5 illustrates a circuit as set forth in FIG. 4 with a bridge circuit according to the invention.

Referring to FIGS. 4 and 5, the processing of the voltages $U_I$ and $U_U$ can be effected in different manners. Referring to FIG. 4, the divider circuit arrangement contains, in analogy to FIG. 2, an induction heating arrangement of a roll indicated by an impedance 17, a shunt 18 arranged in series, a voltage divider 19 and a valve 20. A suitable signal processing device 21 for influencing the valve 20 includes a division device 22 connected to the voltage divider 19 so as to receive the voltage $U_U$ and to a point between the shunt 18 and impedance 17 to receive the voltage $U_I$. In addition, the processing device 21 has a difference amplifier 23 and trigger 25 in series connected directly and via a delay 26 to a flip-flop 27. This is followed by a control signal generator 28 for the valve 20. Between the division device 22 and the difference amplifier 23, a lead 24 is arranged for supplying the pre-set value of the temperature represented by a voltage.

This arrangement functions as follows:

The heating energy flows via the valve 20 to the inductively heated roll which is indicated by the impedance 17. The signals $U_I$ and $U_U$ taken off are transmitted to the division device 22 in which the quotient of the voltage and current signals $U_U/U_I$ are formed as an output which is directly proportional to the impedance 17 of the roll 1 and, thus, to the effective temperature of the cylindrical roll wall 7.

If the temperature exceeds the pre-set value delivered via the lead 24, the current signal $U_I$ at the input of the division device 22 diminishes due to the increased resistance of the impedance 17 and, thus, the output signal of the division device 22 increases. In this way, a positive output voltage is generated at the amplifier 23 which reaches the flip-flop 27 via the trigger 25 and resets it. This causes a shutting signal to be given to the valve 20 by the control signal generator 28. Heating of the roll 1, thus, is interrupted. Simultaneously, an impulse is given to the delay 26, which, in turn, limits an impulse after a time delay 26 which can be chosen as desired e.g. 2 seconds). This latter delayed impulse brings the flip-flop 27 back into working position, so that the control signal generator 28 emits an opening signal to the valve 20. If, e.g. the cylindrical roll wall 7 has not yet cooled down sufficiently, i.e. down to the desired temperature T, the heating is immediately interrupted again. In order to form the quotient $V_U/U_I$ conveniently, the mean values $U_U$ and $U_I$ are formed first and then are subsequently divided. This, however, causes unprecisions, as the inductive current portions are incorporated in the mean value of U. If more precise values are to be obtained, $$P = \frac{1}{t}\int_0^t U \cdot I \, dt$$

can be formed if needed, where $t$ indicates the duration of the period, and $$U^2 = \frac{1}{t}\int_0^t U x U \, dt$$

The value $R = U^2/P$ is obtained by dividing these two values.

The advantage of using the division principle is that a resistance measurement, i.e. the output signal of the division device, is directly proportional to the effective temperature of the cylindrical roll wall 7 over a large range.

Referring to FIG. 5, in addition to a volage source 29 with a network frequency $f$, the valve 30 and the impedance 31 of the roll, a switch 32 is arranged in the heating current circuit. This switch 32 is switched to the position indicated with dashed lines at certain time intervals by a stroke device 33. A voltage source 34 of any voltage desired and of the frequency $f_1$ is connected via the switch 32 in its switched position to the impedance 31 during the time period during which the stroke device 33 opens the heating current circuit. The voltage source 34 is also connected via leads 35 and 36 with a phase discriminator 37. Furthermore, a bridge arrangement 38 with a bridge branch 39 with phase compensation and a bridge branch 40 with pre-set value adjustment is provided. The condensors provided in the bridge branch 39 are used for compensating the inductivities comprised in the impedance 31. The bridge diagonal is connected with a difference amplifier 41, the output voltage of which is proportional to the bridge diagonal voltage. A lead 42 from the difference amplifier connects to the phase discriminator 37 and an amplitude discriminator 43. The outputs of the phase discriminator 37 and of the amplitude discriminator 43 are connected with the input of the control signal generator 44 which generates the adjusting value for the valve 30 for the next heating period. In order to obtain ideal control characteristics, the control signal generator 44 can be constructed as a PID control device. Deviation measuring and display devices 45 are also connected to the phase discriminator 37 and to the amplitude discriminator 43 as shown.

The control device with the bridge arrangement described above functions as follows:

If the switch 32 is in the position shown, the roll represented by the impedance 31 is heated. Should the stroke device 33 switch the switch 32 into the position indicated with dashed lines, the measuring period is started followed by a heating period if the switch 32 is switched back. During this measuring period, the stroke device 33 influences the control signal generator 44 in the sense that the adjusting value for the valve 30 for the following heating period is generated. With the switch 32 in the position indicated with dashed lines, the impedance 31 is connected to the bridge arrangement 38 as a branch. The impedance 31 is then compared herein with the pre-set value in the branch 40. A voltage corresponding to the deviation of the resistance in phase and amplitude is then generated in the diagonal of the bridge 38 and is transmitted to the input of difference amplifier 41. The output voltage of the difference amplifier 41 proportional to the bridge diagonal voltage is transmitted to the two discriminators 37 and 43.

The phase discriminator 37 compares the phase of the output signal of the difference amplifier 41 with the phase of the voltage source 34. As the phase of the bridge voltage changes by 180 degrees while the balancing point of the bridge 38 is passed, the phase clearly indicates whether the impedance 31 is below or above the pre-set value, i.e. whether the roll temperature is above or below desired temperature T. On the other hand, the output signal of the amplitude discriminator 43 represents the size of the deviation from the pre-set value. The output signals of the two discriminators 37, 43 are transmitted to the control signal generator 44 in which the adjusting value for the valve 30 for the next heating period is now formed. This can be effected in one of two known manners. That is, the phase control angle in the valve 30 can be adapted or the duration of the heating period can be adapted by controlling the impulse width.

The output signals of the two discriminators 37, 43 also are transmitted to the deviation measuring and display device 45 for supervising and displaying the roll temperature.

The elements 34, 39 and 40 can be used in a plurality of control circuits and the adjustment of the pre-set value can be effected e.g. for a whole machine at the bridge branch 40. Also, the network for the heating circuit can be used as the voltage source 34. Furthermore, elimination of the switch 32 can be envisaged provided the frequency $f$ of the voltage source 34 differs sufficiently from the network frequency $f$. In this case, the stroke device 33 can be eliminated.

A further simplification is possible if the voltage source 29 and the voltage source 34 are united, provided that the voltage drop via the valve 30 is neglegible, so that the switch 32 can also be eliminated.

The bridge circuit arrangement presents the advantages of the division device arrangement as well as a less complicated circuit design. The use of a measuring frequency independent of the network frequency reduces the susceptibility to network noise and permits more precise sine shapes of the signals to be fed to the amplifier, and thus increased measuring precision.

Figure 6:
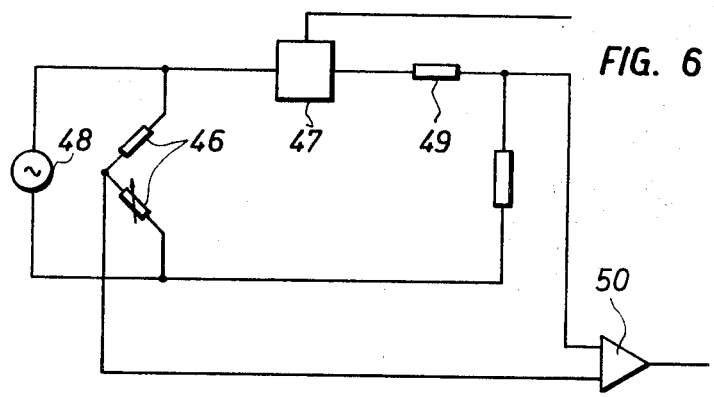
FIG. 6 illustrates another embodiment of the invention with a simplified circuit containing a bridge circuit.

Referring to FIG. 6, an example of a simplified arrangement, a half-bridge 46 can be arranged in front of a valve 47. The supply to the half-bridge 46 is effected from a heating voltage source 48. The valve 47, in this case, must be designed such that the changes in the voltage drop via the valve 47 are neglegibly small. This can be the case, e.g. with a thyristor. One of the bridge resistors is replaced by a current transformer 49 which terminates in a resistor (not shown). After the difference amplifier 50 corresponding to the amplifier 41 above, the other elements as described above with reference to FIG. 5 follow.

Figure 7:
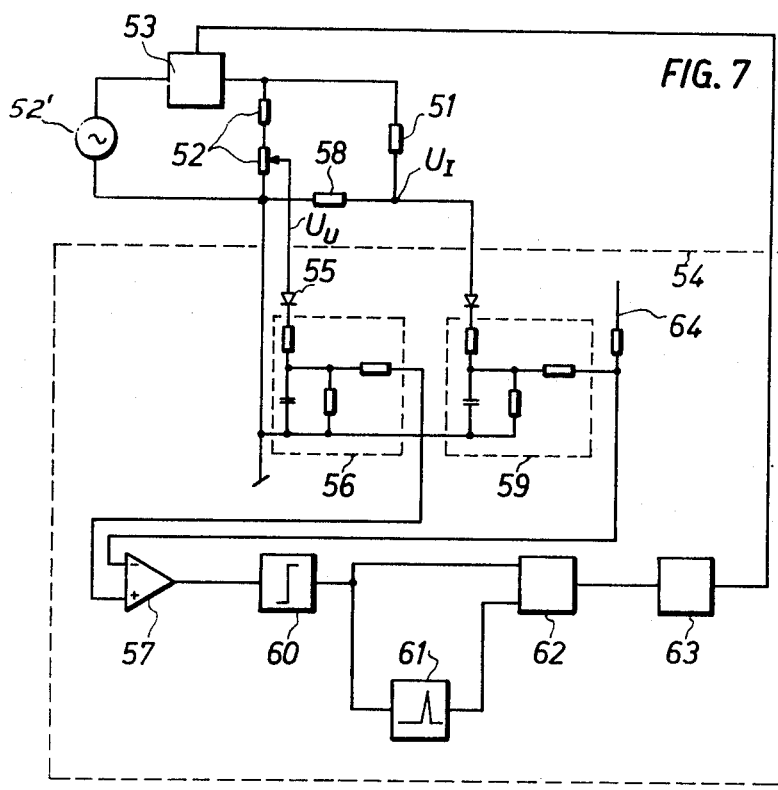
FIG. 7 illustrates a simplified circuit of the control circuit with a difference formation of the tap voltages according to the invention.

Referring to FIG. 7, the control circuit includes an inductively heated roll represented by an impedance 51, an adjustable voltage divider 52 and a valve 53. A suitable signal processing device 54 is constructed as follows.

A voltage source 52' is connected via a converter 55 and a mean value forming device 56 with a difference amplifier 57. The difference amplifier 57 is also connected to a shunt 58 via an analog converter and a mean value forming device 59. After the difference amplifier 57, a trigger 60 follows which is connected directly and via a delay 61 with a flip-flop 62. The flip-flop 62 is thereafter connected to a signal generator 63 for the valve 53. A lead 64 carrying the voltage of the pre-set value, provided for a plurality of identical systems, is connected to the amplifier 57 input for $U_I$.

The arrangement functions as follows:

The heating energy flows via the valve 53 to the inductively heated roll represented by the impedance 51. The previously converted voltages $U_I$ and $U_U$ are averaged over a certain time constant via the mean value forming device 56 and 59 and are then transmitted to the difference amplifier 57. The voltage signal $U_U$ by means of the adjustable voltage divider, is now chosen such that at the desired roll temperature T, the current and voltage signals transmitted to the difference amplifier 57 are equal. If the pre-set temperature is now exceeded, the current signal $U_I$ at the input of the amplifier 57 becomes smaller than the voltage signal $U_U$ due to the increased resistance of the impedance 51. Thus, a negative output voltage is generated by the amplifier 57 which is further processed as in the example described with reference to FIG. 4.

The circuit design arrangement with difference formation is characterized by uncomplicated circuits and is particularly suited for applications with a small range of adaption of the pre-set temperature.

The heating control arrangements described with reference to FIGS. 4 and 7, thus function as a special type of a two-point control system in which the supply of heating energy is interrupted each time the preset temperature value is reached. The near-ideal arrangement with respect to control dynamics of heat generator, measuring gauge and heat consumer makes this arrangement feasible without noticeable overshooting and pendling. The valve and the control signal generator, however, can also be designed such that the amplitude of the heating voltage is adjusted continuously (e.g. phase control angle, adjustable transformer) and that the control characteristics are of the PID type.

WHAT IS CLAIMED IS:

1. In combination with a rotatable thread transporting roll for endless filaments having an internal roll wall, a stationary iron core arranged coaxially within said roll wall, an induction coil surrounding said core, and a source of alternating current for generating an alternating magnetic flux in said roll wall to heat said roll; a valve for controlling the heating energy supplied to said induction coil, a control device for activating said valve, and a signal processing device connected to said control device and including a connection to said coil for transmitting a signal proportional to the voltage applied to said coil, a connection for transmitting a signal proportional to the current in said coil and means for transforming said signals into a signal proportional to the resistance of said roll for transmission to said control device.

2. The combination as set forth in claim 1 wherein said means for forming said signal proportional to the resistance of said roll forms a quotient of said signal proportional to the voltage applied to said coil and said signal proportional to the current in said coil.

3. The combination as set forth in claim 1 wherein said means for forming said signal proportional to the resistance of said roll forms a difference of said signal proportional to the voltage applied to said coil and said signal proportional to the current in said coil.

4. The combination as set forth in claim 1 wherein said means for forming said signal proportional to the resistance of said roll is a bridge circuit arrangement.

5. The combination as set forth in claim 1 wherein said signals are formed during a heating period at network frequency.

6. The combination as set forth in claim 1 wherein said signals are formed during a heating period with a voltage having a frequency different from network frequency.

7. The combination as set forth in claim 1 wherein said signals are formed between two heating periods with a measuring voltage of predetermined frequency.

8. The combination as set forth in claim 1 wherein said control device includes an impulse ratio control.

9. The combination as set forth in claim 1 wherein said control device includes an amplitude control.

10. The combination as set forth in claim 9 wherein said amplitude control is a phase angle control.

11. The combination as set forth in claim 9 wherein said amplitude control is an adjustable transformer for varying the applied heating voltage.

* * * * *

UNITED STATES PATENT OFFICE
CERTIFICATE OF CORRECTION

Patent No. 3,686,460     Dated August 22, 1972

Inventor(s) Hansruedi Lamparter et al

It is certified that error appears in the above-identified patent and that said Letters Patent are hereby corrected as shown below:

Column 4, line 42, "$\sigma_1$" should be --$L\sigma_1$--

Column 6, line 43, "$V_u/U_1$" should be --$\dfrac{U_U}{U_I}$--

Column 6, line 47, "U" should be --$U_I$--

Signed and sealed this 9th day of January 1973.

(SEAL)
Attest:

EDWARD M. FLETCHER, JR.
Attesting Officer

ROBERT GOTTSCHALK
Commissioner of Patents